(12) United States Patent
Nguyen et al.

(10) Patent No.: US 10,410,093 B2
(45) Date of Patent: Sep. 10, 2019

(54) MEDICAL PATTERN CLASSIFICATION USING NON-LINEAR AND NONNEGATIVE SPARSE REPRESENTATIONS

(71) Applicant: Siemens Healthcare GmbH, Erlangen (DE)

(72) Inventors: Hien Nguyen, Pittsburgh, PA (US); Shaohua Kevin Zhou, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/563,970

(22) PCT Filed: Jun. 4, 2015

(86) PCT No.: PCT/US2015/034097
§ 371 (c)(1),
(2) Date: Oct. 3, 2017

(87) PCT Pub. No.: WO2016/195683
PCT Pub. Date: Dec. 8, 2016

(65) Prior Publication Data
US 2018/0137393 A1    May 17, 2018

(51) Int. Cl.
*G06K 9/62* (2006.01)
*G06K 9/46* (2006.01)

(52) U.S. Cl.
CPC ......... *G06K 9/6268* (2013.01); *G06K 9/6249* (2013.01); *G06K 9/6259* (2013.01); *G06K 2009/4695* (2013.01); *G06K 2209/05* (2013.01)

(58) Field of Classification Search
CPC ... G06K 9/6268; G06K 9/2081; G06K 9/6249
(Continued)

(56) References Cited

U.S. PATENT DOCUMENTS

| 2015/0110381 A1* | 4/2015 | Parvin | G06K 9/6249 |
| | | | 382/133 |
| 2016/0005183 A1* | 1/2016 | Thiagarajan | A61B 5/055 |
| | | | 382/131 |
| 2016/0171708 A1* | 6/2016 | Kim | G06T 7/11 |
| | | | 382/128 |

OTHER PUBLICATIONS

Yuchen Xie et al, "On a Nonlinear Generalization of Sparse Coding and Dictionary Learning", Jun. 16, 2013, Machine learning: proceedings of the International Conference. International Conference on Machine Learning.*

(Continued)

*Primary Examiner* — Justin P. Misleh (57) ABSTRACT

A method of classifying signals using non-linear sparse representations includes learning a plurality of non-linear dictionaries based on a plurality of training signals, each respective nonlinear dictionary corresponding to one of a plurality of class labels. A non-linear sparse coding process is performed on a test signal for each of the plurality of non-linear dictionaries, thereby associating each of the plurality of non-linear dictionaries with a distinct sparse coding of the test signal. For each respective non-linear dictionary included in the plurality of non-linear dictionaries, a reconstruction error is measured using the test signal and the distinct sparse coding corresponding to the respective non-linear dictionary. A particular nonlinear dictionary corresponding to a smallest value for the reconstruction error among the plurality of non-linear dictionaries is identified and a class label corresponding to the particular non-linear dictionary is assigned to the test signal.

16 Claims, 8 Drawing Sheets

(58) Field of Classification Search
USPC .......................................................... 382/131
See application file for complete search history.

(56) References Cited

OTHER PUBLICATIONS

Wang, Fenghua et al. "Iris Recognition Under Partial Occlusion Based on Non-negative Sparse Representation Classification." (2016). (Year: 2016).*
P. O. Hoyer. Non-negative sparse coding. In Neural Networks for Signal Processing XII (Proc. IEEE Workshop on Neural Networks for Signal Processing), pp. 557-565, Martigny, Switzerland, 2002. (Year: 2002).*
Zhang, Chunjie et. (2011). Image classification by non-negative sparse coding, low-rank and sparse decomposition. Proceedings of the IEEE Computer Society Conference on Computer Vision and Pattern Recognition. 1673-1680. 10.1109/CVPR.2011.5995484. (Year: 2011).*
Wee, Chong-Yaw, et al. "Constrained sparse functional connectivity networks for MCI classification." Medical Image Computing and Computer-Assisted Intervention—MICCAI 2012 (2012): 212-219.
Liu, Meizhu, et al. "Sparse classification for computer aided diagnosis using learned dictionaries." Medical Image Computing and Computer-Assisted Intervention—MICCAI 2011 (2011): 41-48.
Van Nguyen, Hien, et al. "Design of non-linear kernel dictionaries for object recognition." IEEE Transactions on Image Processing 22.12 (2013): 5123-5135.
Gál, Viktor, et al. "Modality Classification for Medical Images Using Sparse Coded Affine-Invariant Descriptors." PAKDD Workshops. 2012.
Zhang, Kai, Ivor W. Tsang, and James T. Kwok. "Improved Nystrom low-rank approximation and error analysis." Proceedings of the 25th international conference on Machine learning. ACM, 2008.
International Search Report for Corresponding Application No. PCT/US2015/034097 dated Feb. 25, 2016.
Yuchen Xie, et al.: "On a Nonlinear Generalization of Sparse Coding and Dictionary Learning", Machine learning: proceedings of the International Conference on Machine Learning, Jun. 16, 2013, pp. 1480-1488.
Van Nguyen, Hien, et al.: "Kernel dictionary teaming", 2012 IEEE International Conference on Acoustics, Speech and Signal Processing: Kyoto, Japan, Mar. 25-30, 2012; Proceedings IEEE, Piscataway, NJ, Mar. 25, 2012, p. 2021-2024.
Roy, Snehashis, et al.: "Subject Specific Sparse Dictionary Learning for Atlas Based Brain MRI Segmentation", Sep. 14, 2014, Correct System Design; Springer International Publishing, pp. 248-255.
Tong, Tong, et al.: "Segmentation of MR images via discriminative dictionary learning and sparse coding: Application to hippocampus labeling the Alzheimer's Disease Neuroimaging Initiative", Mar. 30, 2013.

* cited by examiner

MEDICAL PATTERN CLASSIFICATION USING NON-LINEAR AND NONNEGATIVE SPARSE REPRESENTATIONS

TECHNICAL FIELD

The present disclosure relates generally to methods, systems, and apparatuses, for medical classification where non-linear and non-negative sparse representations are used to assign class labels to test signals. The disclosed techniques may be applied, for example, to the classification of magnetic resonance (MR) images.

BACKGROUND

Within medical science, pattern classification is the basis for computer-aided diagnosis (CAD) systems. CAD systems automatically scan medical image data (e.g., gathered via imaging modalities such as X-Ray, MRI, or Ultrasound) and identify conspicuous structures and sections that may be indicative of a disease. Traditionally, classification is often done using popular methods such as support vector machine (SVM), boosting, and neural networks. These are discriminative approaches since their objective functions are directly related to the classification errors. However, discriminative classifiers are sensitive to data corruption. Their trainings are also prone to over-fitting when facing the lack of training samples.

Recently, sparse representation (SR) based classification has gained significant interests from researchers across different communities such as signal processing, computer vision, and machine learning. This is due to its superior robustness against different types of noise. For example, an SR framework is capable of handling occlusion and corruption by exploiting the property that these artifacts are often sparse in terms of pixel basis. The classification is often done by first learning a good sparse representation for each pattern class. Some examples of effective algorithms for learning sparse representation are the method of optimal direction, KSVD, and online dictionary learning. A test sample is classified by computing maximum likelihood function given each sparse representation. It has been shown that this approach outperforms the state of the art of discriminative methods on many practical applications.

Although SR holds a great promise for CAD applications, they have certain disadvantages that can be improved. In particular, the linear model traditionally employed by SR-based systems is often inadequate to represent nonlinear information associated with the complex underlying physics of medical imaging. For instance, contrast agents and variation of the dose in computed tomography nonlinearly change the appearance of the resulting image. Medical images are also subjected to other common sources of nonlinear variations such as rotation and shape deformation. The traditional sparse representation framework would need much larger number of dictionary atoms to accurately represent these nonlinear effects. This, in turn, requires a larger number of training samples which might be expensive to collect, especially for medial settings.

SUMMARY

Embodiments of the present invention address and overcome one or more of the above shortcomings and drawbacks, by providing methods, systems, and apparatuses that perform a medical pattern classification using non-linear and non-negative sparse representations. This technology is particularly well-suited for, but by no means limited to, imaging modalities such as Magnetic Resonance Imaging (MRI).

According to some embodiment, a method of classifying signals using non-linear sparse representations includes learning non-linear dictionaries based on training signals, each respective non-linear dictionary corresponding to one of class labels. A non-linear sparse coding process is performed on a test signal for each of the non-linear dictionaries, thereby associating each of the non-linear dictionaries with a distinct sparse coding of the test signal. For each respective non-linear dictionary included in the non-linear dictionaries, a reconstruction error is measured using the test signal and the distinct sparse coding corresponding to the respective non-linear dictionary. The non-linear dictionary corresponding with the smallest value for the reconstruction error among the non-linear dictionaries is identified and a class label corresponding to the particular non-linear dictionary is assigned to the test signal. In some embodiments, the method further includes displaying an image corresponding to the test signal with an indication of the class label.

Various enhancements or other modifications may be made to the aforementioned method in different embodiments. For example, in some embodiments, the method further comprises cropping a subset of the training signals prior to building the non-linear dictionaries. This cropping may be performed, for example, by identifying a region of interest in the respective training signal and discarding portions of the respective training signal outside the region of interest. In some embodiments, the training signals comprise anatomical images and the method further comprises identifying the region of interest in the respective training signal based on a user-supplied indication of an anatomical area of interest. In some embodiments, a non-negative constraint is applied to the non-linear dictionaries during learning. For example, the non-negative constraint may be applied to the distinct sparse coding of the test signal associated with each of the non-linear dictionaries during the non-linear sparse coding process. In some embodiments, the training signals and the test signal each comprise a k-space dataset acquired using magnetic resonance imaging. The class labels described in the aforementioned method may include an indication of disease present in an anatomical area of interest depicted in the test signal.

According to other embodiments, a second method of classifying signals using non-linear sparse representations includes receiving non-linear dictionaries (each respective non-linear dictionary corresponding to one of class labels) and acquiring a test image dataset of a subject using a magnetic resonance imaging device. A non-linear sparse coding process is performed on the test image dataset for each of the non-linear dictionaries, thereby associating each of the non-linear dictionaries with a distinct sparse coding of the test image dataset. Next, for each respective non-linear dictionary included in the non-linear dictionaries, a reconstruction error is measured using the test image dataset and the distinct sparse coding corresponding to the respective non-linear dictionary. A particular non-linear dictionary corresponding a smallest value for the reconstruction error among the non-linear dictionaries is identified. Then, clinical diagnosis is provided for the subject based on a particular class label corresponding to the particular non-linear dictionary to the test image dataset. In some embodiments, the method further includes displaying the test image dataset simultaneously with the clinical diagnosis.

The aforementioned second method of classifying signals using non-linear sparse representations may include additional features in different embodiments. For example, in some embodiments, the method includes a step wherein an optimization process is used to learn the non-linear dictionaries based on training images. The method may also include cropping a subset of the training images prior to using the optimization process (e.g., by identifying a region of interest in the image and discarding portions outside that region). In some embodiments, the optimization process applies a non-negative constraint to the non-linear dictionaries during learning. For example, the non-negative constraint may be applied to the distinct sparse coding of the test image dataset associated with each of the non-linear dictionaries during the non-linear sparse coding process.

According to other embodiments, a system for classifying image data for clinical diagnosis comprises an imaging device configured to acquire test image dataset of a subject and an image processing computer. The image processing computer is configured to receive non-linear dictionaries (each respective non-linear dictionary corresponding to one of class labels) and perform a non-linear sparse coding process on the test image dataset for each of the non-linear dictionaries, thereby associating each of the non-linear dictionaries with a distinct sparse coding of the test image dataset. The image processing computer is further configured to measure a reconstruction error for each respective non-linear dictionary included in the non-linear dictionaries using the test image dataset and the distinct sparse coding corresponding to the respective non-linear dictionary. The image processing computer identifies a particular non-linear dictionary corresponding to a smallest value for the reconstruction error among the non-linear dictionaries, and generates a clinical diagnosis for the subject based on a particular class label corresponding to the particular non-linear dictionary to the test image dataset. In some embodiments, the aforementioned system further comprises a display configured to present the clinical diagnosis for the subject.

In some embodiments of the aforementioned system, the image processing computer is further configured to perform an optimization process to learn the non-linear dictionaries based on training images. Additionally, in some embodiments, the image processing computer is further configured to apply a non-negative constraint to the non-linear sparse coding process and the optimization process.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to medical pattern classification using non-linear and non-negative sparse representations. Briefly, a framework and corresponding techniques are presented herein that make use of sparse representation for both feature extraction and classification. The described techniques are generative, yet, significantly outperform their discriminative counterparts. In particular, the techniques demonstrate how to learn nonlinear sparse representation. In addition, in some embodiments, the techniques allow the possibility of enforcing positivity constraint on the sparse coefficients.

Figure 1:
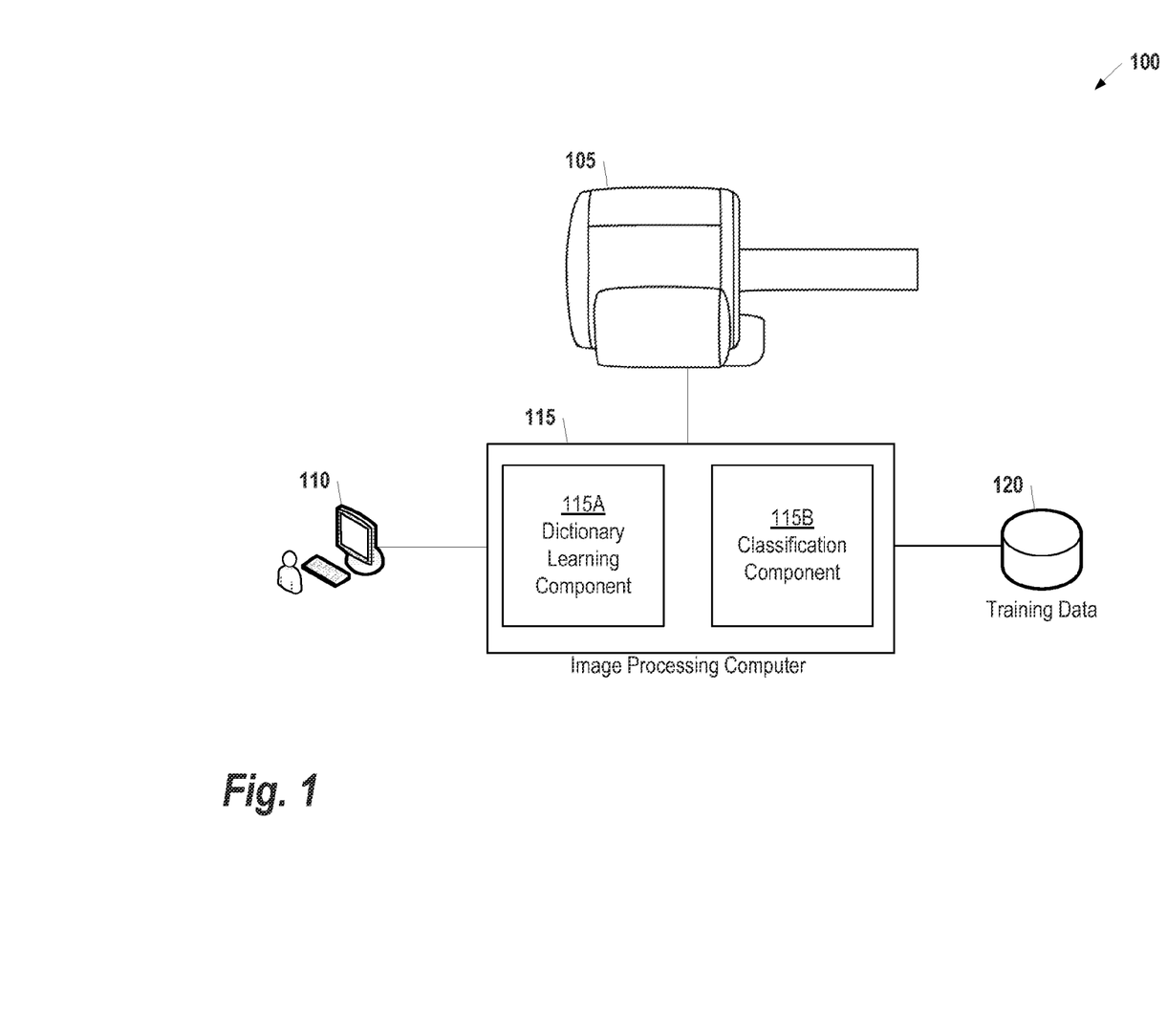
FIG. 1 provides an overview of a system for performing medical pattern classification using non-linear and non-negative sparse representations, according to some embodiments.

FIG. 1 provides an overview of a system 100 for performing medical pattern classification using non-linear and non-negative sparse representations, according to some embodiments. Briefly, the system 100 illustrated in FIG. 1 includes an Image Processing Computer 115 which is operably coupled to an Imaging Device 105 which acquires signals of a subject. In the example of FIG. 1, the Imaging Device 105 is a Magnetic Resonance Imaging (MRI) device, however it should be understood that other imaging devices may alternatively be used in different embodiments. The Image Processing Computer 115 creates dictionaries for class labels based on a training signals retrieved from Training Database 120. Based on these dictionaries, the Image Processing Computer 115 can classify the signal acquired from the Imaging Device 105 according to one or more class labels. A User Interface Computer 110 provides parameters to the Image Processing Computer 115 which helps guide the dictionary learning and classification processes. Additionally, the Image Processing Computer 115 may output the acquired signal, along with any generated class labels, on the User Interface Computer 110.

The Image Processing Computer 115 is configured to execute a framework that makes use of sparse representation for both feature extraction and classification. To formulate the problem, let $\Phi: \mathbb{R}^n \to \mathcal{F} \subset \mathbb{R}^{\tilde{n}}$ be a non-linear transformation from $\mathbb{R}^n$ a dot product space $\mathcal{F}$. The Image Processing Computer 115 retrieves training signals from the Training Database 120 and forms a matrix Y whose columns are the retrieved training signals. It should be noted that database retrieval is only one way that the training signals may be received by the Image Processing Computer 115. In other embodiments, for example, a user may directly upload them to the Image Processing Computer 115.

In order to learn nonlinearities within the data, each column of Y may be transformed onto another Hilbert space where nonlinear structures can be expressed using simple Euclidean geometry. Let $\Phi: \mathbb{R}^n \to \mathcal{F} \subset \mathbb{R}^{\tilde{n}}$ a non-linear transformation from $\mathbb{R}^n$ a dot product space $\mathcal{F}$. The problem of learning a sparse representation in the transformed space may then be posed as follows:

$$\{D^*, X^*\} = \underset{D,X}{\mathrm{argmin}} \|\Phi(Y) - DX\|_F^2 + \lambda \|X\|_1 \qquad (1)$$

The l1-norm regularization on coefficients X promotes sparsity in the optimization. The optimal sparse representation corresponding to Equation 1 has the following form:

$$D^* = \Phi(Y)A \qquad (2)$$

for some $A \in \mathbb{R}^{N \times K}$. In other words, dictionary atoms lie within the span of the transformed signals. This allows Equation 1 to be rewritten in an alternative way. The optimal sparse representation may be found by minimizing the objective function with respect to the coefficient matrix A instead of D:

$$\{A^*, X^*\} = \underset{A,X}{\mathrm{argmin}} \|\Phi(Y) - \Phi(Y)AX\|_F^2 + \lambda \|X\|_1 = \qquad (3)$$
$$\underset{A,X}{\mathrm{argmin}}(tr((I-AX)^T \mathbb{K}(Y,Y)(I-AX)) + \lambda\|X\|_1)$$

Note that, unlike Equation 1, Equation 3 does not explicitly depend on the transformation $\Phi(.)$, but the induced kernel matrix $$\mathbb{K}(Y,Y) = \Phi(Y)^T \Phi(Y) \qquad (4)$$

This eliminates the need to explicitly map signals to high dimensional non-linear space and, therefore, makes the computation more feasible. More specifically, it is more efficient to optimize the objective function in (3) since it only involves a kernel matrix of finite dimension $\in \mathbb{R}^{N \times N}$, instead of dealing with a possibly infinite dimensional dictionary in Equation 1.

The Image Processing Computer 115 may optimize the objective function in (3) in an iterative fashion. Note that the induced kernel matrix shown in Equation 4 could be efficiently approximated using Nystrom method. When the sparse coefficient is fixed, the dictionary can be updated via A as follows:

$$A = X^T(XX^T)^{-1} \qquad (5)$$

Similarly, when the dictionary is fixed, the objective function in (3) becomes convex with respect to coefficient matrix X and can be solved efficiently using specialized sparse coding methods such as, for example, proximal optimization and iterative shrinkage. In some embodiments, a positivity constraint is added, i.e. X>0. However, even in these embodiments, the objective function is still convex and the sparse coding could also be done using these same techniques.

Figure 2:
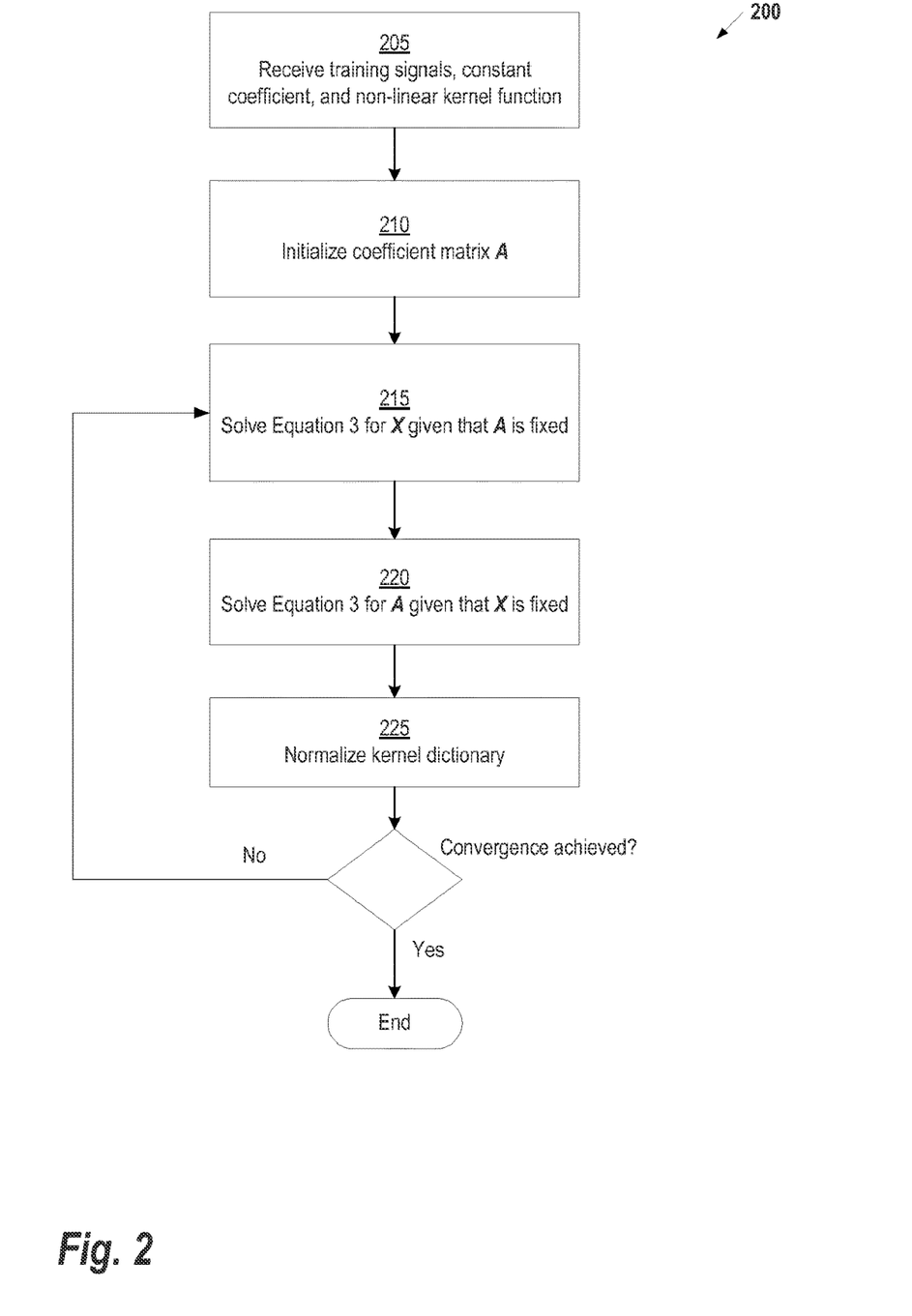
FIG. 2 provides a non-linear sparse coding and dictionary learning process, according to some embodiments.

FIG. 2 provides a non-linear sparse coding and dictionary learning process 200 that may be performed by the Dictionary Learning Component 115A, according to some embodiments. At step 205, a set of training signals Y, a constant coefficient $\lambda$, and a non-linear kernel function K are received, for example, from the Training Database 120 and the User Interface Computer 110, respectively. Next, a kernel dictionary represented by coefficient matrix A is learned by optimizing the cost function in (3). At step 210, each column of A is initialized. In some embodiments, each column of A is randomly initialized to have only one non-zero coefficient at random position.

At step 215, Equation 3 is solved for X given that A is fixed. In some embodiments, a non-negative constraint on X may be added. Since the problem becomes convex when fixing A, a solution can be obtained using any convex optimization toolbox generally known in the art. Next, at step 220, Equation 3 is solved for A when X is fixed using Equation 5. Then, at step 225, each column of the kernel dictionary is normalized to the unit norm. Steps 215-225 are repeated until convergence. The result of this process is a kernel dictionary represented by A.

Figure 3:
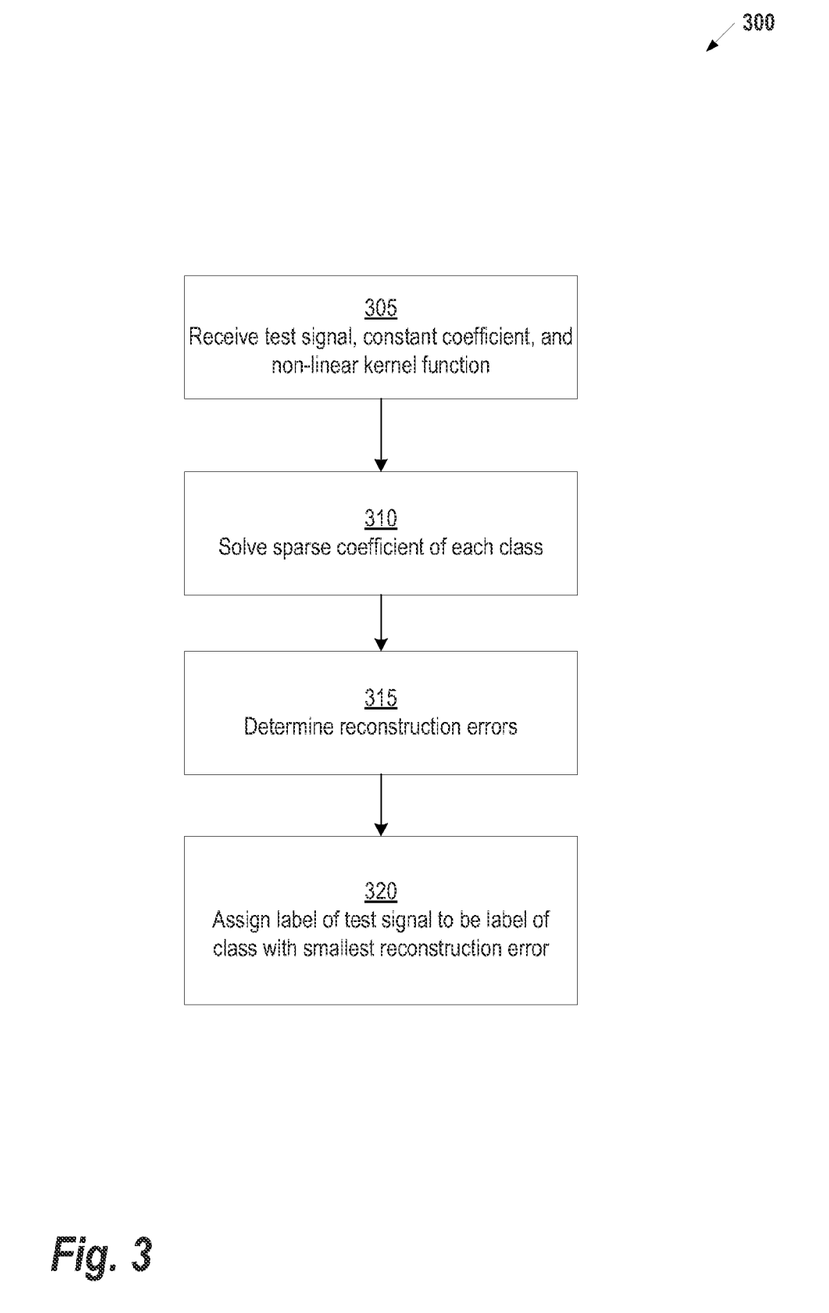
FIG. 3 illustrates a process for classification using non-linear dictionary as may be implemented in some embodiments.

FIG. 3 illustrates a process 300 for classification using non-linear dictionary as may be implemented by the Classification Component 115B in some embodiments. At step 305, a test signal z, a constant coefficient $\lambda$, a non-linear kernel function K, are received, for example, from the Imaging Device 105 and the User Interface Computer 110, respectively. Additionally, the dictionary matrix A generated for each class by the Dictionary Learning Component 115A is assembled.

Next, the signal z is classified into one of the classes. At step 310, a sparse coefficient of each class, $x_i$, is solved by optimizing Equation 3 and replacing A with a class-specific dictionary $A_i$. At step 315, the reconstruction errors for all classes are determined (i.e. how well dictionary of i-th class reconstruct the test signal z). These errors may be calculated according to the following equation:

$$r_i = \|(\Phi(z) - \Phi(Y_i)A_i x_i\|_F^2 \qquad (6)$$

Then, at step 320, the label of z is assigned to be the label of the class with smallest reconstruction error.

Figure 4:
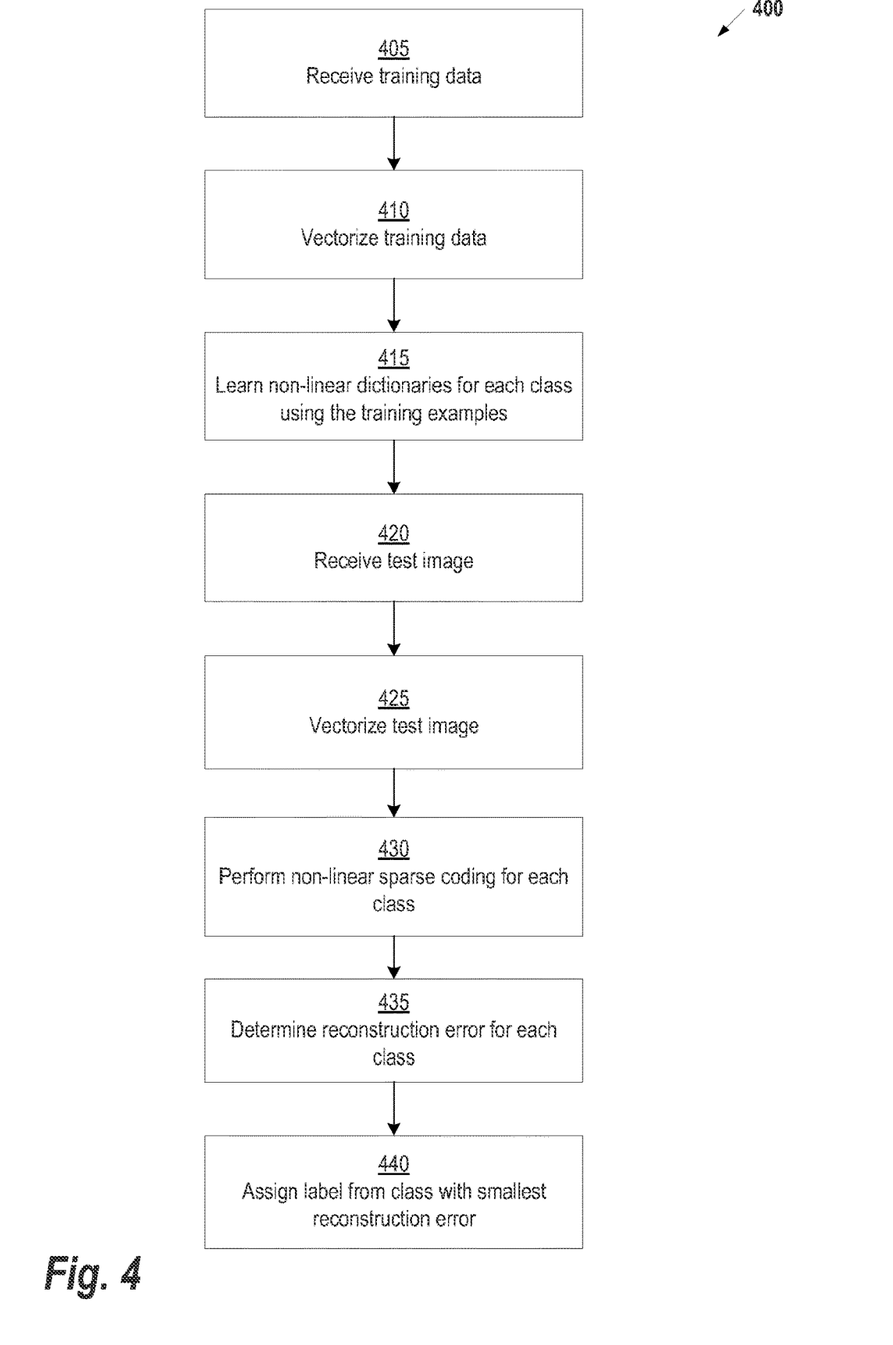
FIG. 4 provides additional detail on a method medical pattern classification using non-linear sparse representations as it may be applied to classification of MRI images, according to some embodiments.

FIG. 4 provides additional detail on a method 400 medical pattern classification using non-linear sparse representations as it may be applied to classification of MRI images, according to some embodiments. The method can be divided into two general operations: creating a dictionary using training data and using the dictionary to perform medical pattern classification. Starting at step 405, a set of training data is received. This training data comprises labeled set of images Y acquired using an MRI imaging device (e.g., Imaging Device 105 in FIG. 1). In some embodiments, dictionaries are generated for various imaging modalities. Thus, later during the classification step, the system can be flexible enough to be able to respond to any type of test image. The labels applied to each respective image are used to categorize the image into a class. The class types will vary, for example, based on the portion of anatomy which was imaged and the pathological features being classified. In some cases, a raw labeling strategy may be employed. For example, a 3D MRI image of a brain may be labeled as "abnormal" or "normal." In other embodiments, a more detailed labeled strategy may be used. Continuing with the previous example, the brain image may be labeled as having markers indicative of Alzheimer's disease. It should be noted that the robustness of the classification will directly depend on the robustness of the labels. Thus, in some embodiments, once the training images are received at 305, they maybe manually labelled with more detailed information to allow for more comprehensive learning.

Continuing with reference to FIG. 4, at step 410, each labeled image received in the training set is vectorized. Vectorization may be performed, for example, by reshaping the multidimensional signal of the image data into a single dimensional vector. In some embodiments, if the size of the image is greater than a predefined threshold (e.g., set by the user), the image data may be cropped or scanned prior to vectorization to reduce the size and focus on an area of interest. Once each image has been vectorized, at step 415, non-linear dictionaries Φ(D) are learned from Φ(Y) for each class using the set of training examples. Optionally, a non-negative constraint may be incorporated during the learning of D. It should be noted that, if the dictionary is learned with a non-negative constraint, a non-negative constraint should also be used in the test space, as described below.

At steps 420 and 425, a test image $y_{test}$ is received and vectorized, for example, in a manner similar to that discussed above with respect to steps 305 and 310. Then, at step 430, non-linear sparse coding is performed by optimizing the following equation for each class.

$$\|\Phi(y_{test})-\Phi(D)x_{test}\|_F^2+\lambda\|x_{test}\|_1$$

In some embodiments, a non-negative constraint may be applied to $x_{test}$ if such a constraint was used during training at step 315. FIG. 4 may be optimized via biconvex optimization process, as described above with respect to FIG. 3. At step 435, the reconstruction error r is determined for each class according to the following equation:

$$r=\|\Phi(y_{test})-\Phi(D)x_{test}\|_F^2$$

Then at step 440, a label is assigned from the class with the smallest reconstruction error determined at step 435. In some embodiments, the label is presented along with the test image on a display to allow for diagnosis, for example, in clinical settings.

Figure 5:
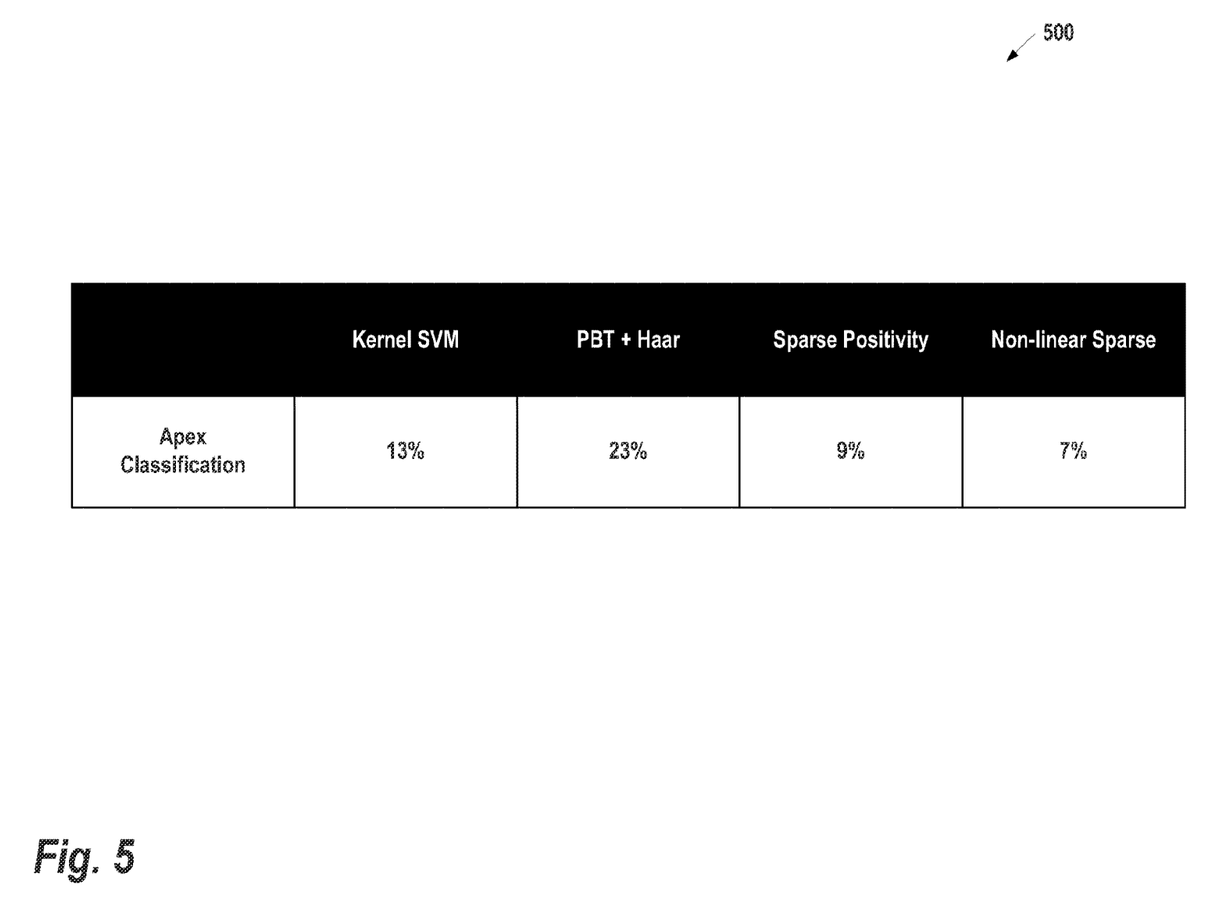
FIG. 5 shows a table provided illustrating a comparison of classification accuracy with respect to different methods described herein.
Figure 6:
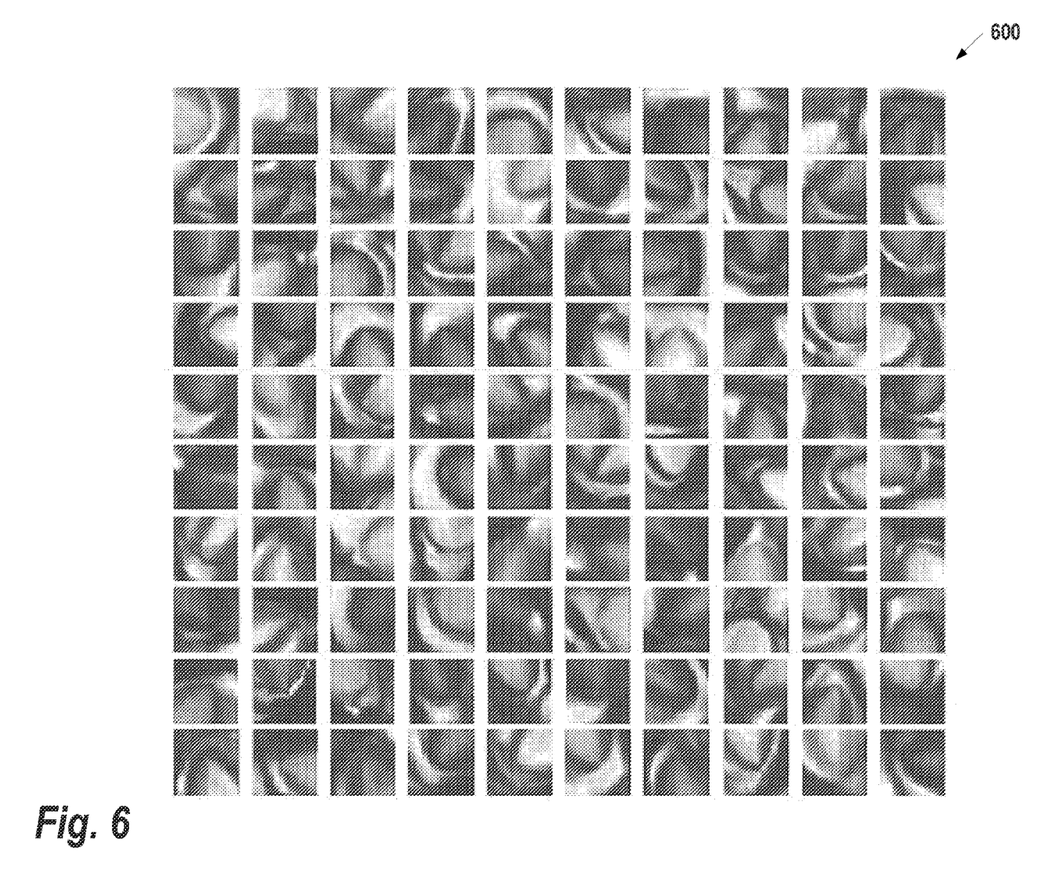
FIG. 6 provides an illustration of some of the dictionary atoms learned from the data, according to one example application described herein.

To illustrate the medical classification technique described herein, a sparse representation was learned for 20 MR apex images. There were 5970 images (from 138 patients) for training and 1991 images (from 46 patients) for testing. Images were of 32×32 pixels resolution. In addition, the images were uniformly rotated to generate 10 samples from one positive sample. The negative samples were not rotated while sampling more to match the number of positive samples. In total, there were 119,400 training samples. A dictionary of 5000 atoms was learned for each class (i.e. positive and negative) with sparse regularization set to 0.3. Given a new test sample, sparse coding was performed on all dictionaries and their corresponding residual errors were computed. The sample was assigned a label of the class with smallest residual error. Note that, in some embodiments, residual may be combined with sparse codes to improve the performance. The table 500 provided in FIG. 5 shows the classification accuracy comparison between different methods. It is interesting that sparse method, despite being generative in nature, outperforms other discriminative approaches like Support Vector Machine (SVM) by a significant margin. FIG. 6 provides an illustration of some of the dictionary atoms 600 learned from the data, which clearly capture meaningful structures of the apex images.

Figure 7:
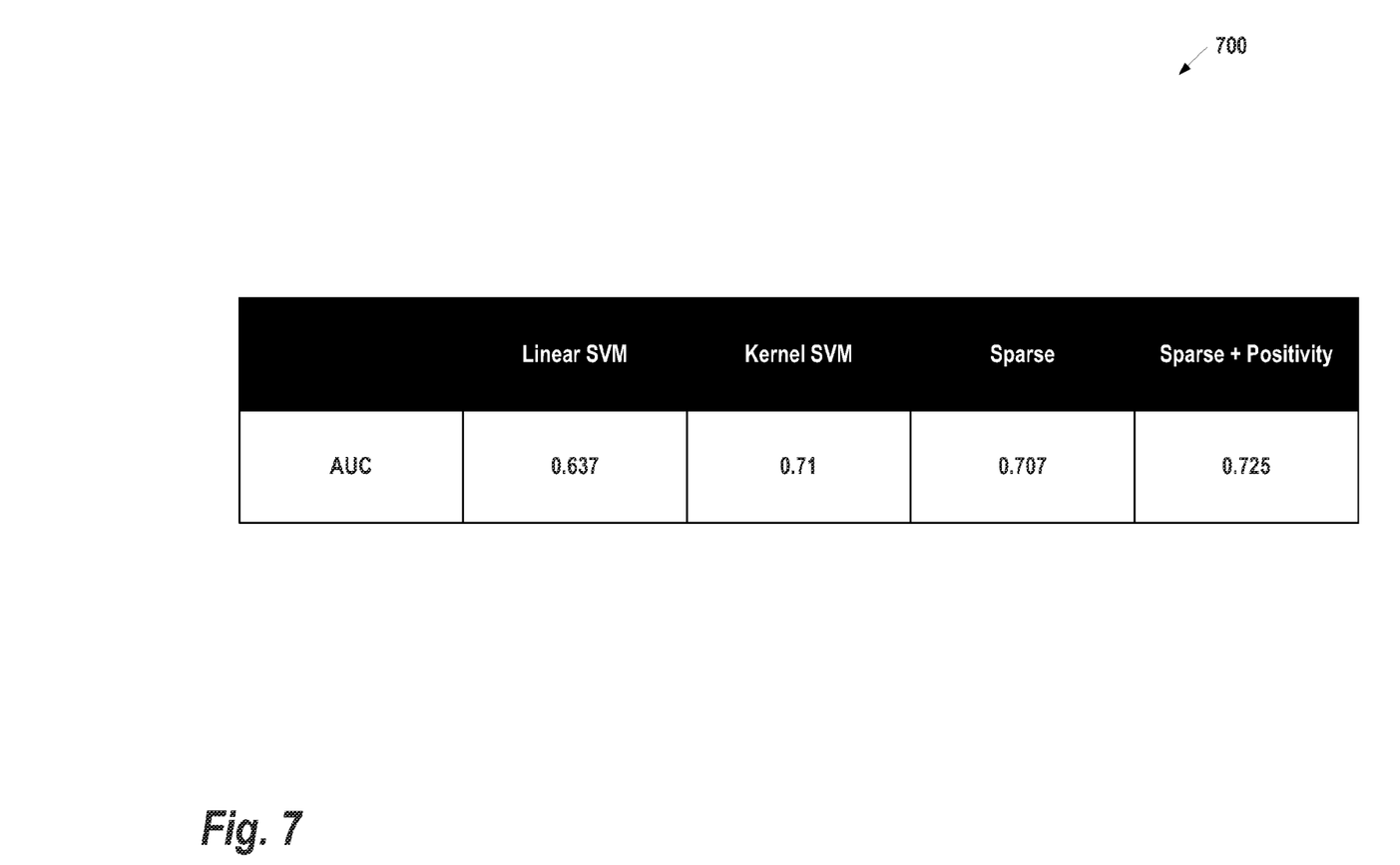
FIG. 7 provides a comparison of classification accuracy between different approaches described herein.

Additionally, a sparse representation based classification approach was evaluated on a more challenging dataset. This dataset contained more than 120 patients' records with both continuous and categorical variables. The goal was to predict the risk of restenosis based on the patient's health condition and medical intervention indicated in his/her record. A successful solution to this problem, i.e. higher classification accuracy, would enable doctors to design more personalized treatments for their patients. 4000 samples in the datasets were split equally for training and testing. FIG. 7 provides a table 700 showing a comparison of classification accuracy between different approaches. It can be noticed that the sparse classification with a non-negative constraint on sparse coefficients outperforms discriminative methods. Both experiments on the apex dataset and the restenosis dataset clearly demonstrate the advantage of our sparse representation based classification approach.

Figure 8:
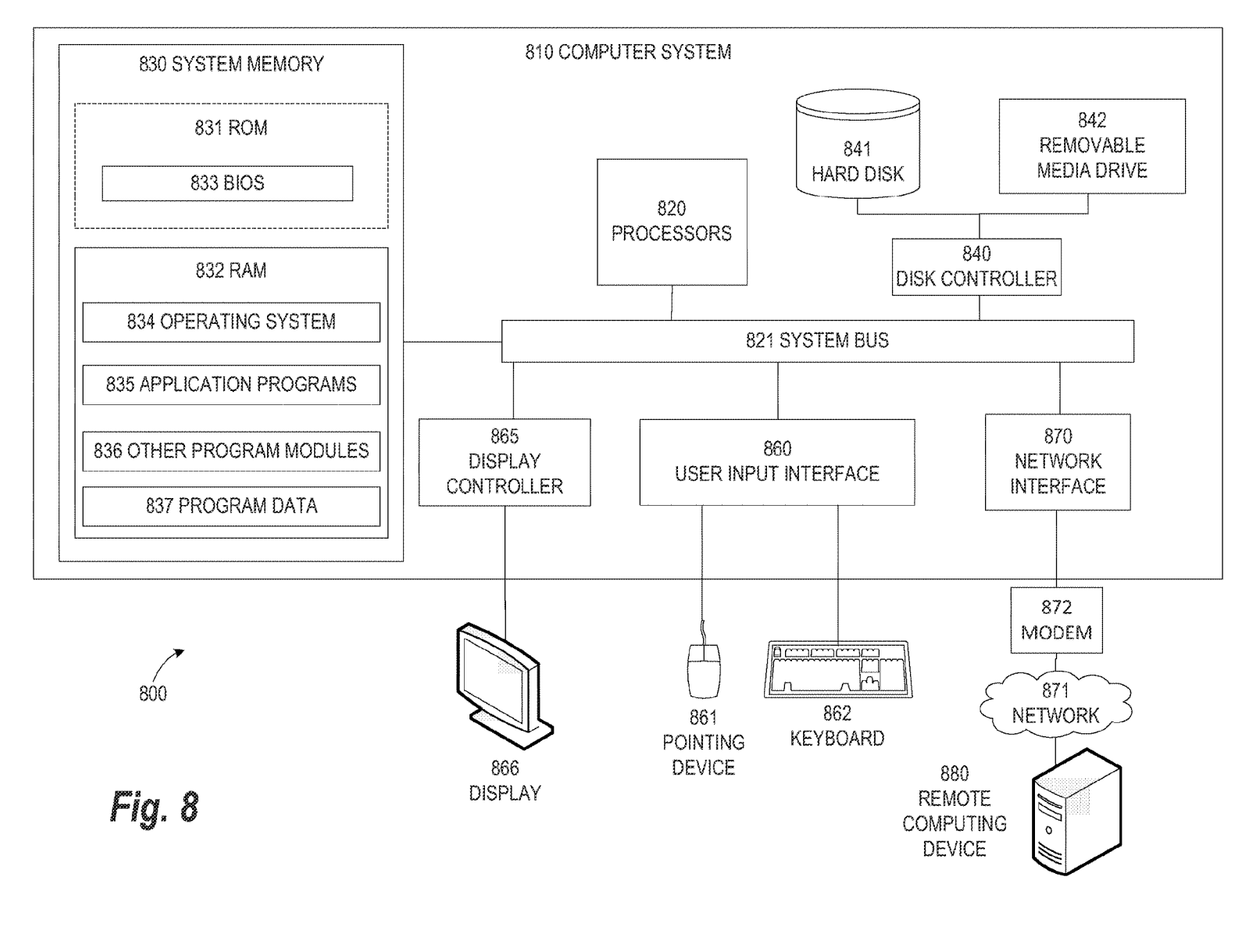
FIG. 8 illustrates an exemplary computing environment within which embodiments of the invention may be implemented.

FIG. 8 illustrates an exemplary computing environment 800 within which embodiments of the invention may be implemented. For example, this computing environment 800 may be used to implement the processes 200, 300, and 400 of image reconstruction described in FIGS. 2-4. In some embodiments, the computing environment 800 may be used to implement one or more of the components illustrated in the system 100 of FIG. 1. The computing environment 800 may include computer system 810, which is one example of a computing system upon which embodiments of the invention may be implemented. Computers and computing environments, such as computer system 810 and computing environment 800, are known to those of skill in the art and thus are described briefly here.

As shown in FIG. 8, the computer system 810 may include a communication mechanism such as a bus 821 or other communication mechanism for communicating information within the computer system 810. The computer system 810 further includes one or more processors 820 coupled with the bus 821 for processing the information. The processors 820 may include one or more central processing units (CPUs), graphical processing units (GPUs), or any other processor known in the art.

The computer system 810 also includes a system memory 830 coupled to the bus 821 for storing information and instructions to be executed by processors 820. The system memory 830 may include computer readable storage media in the form of volatile and/or nonvolatile memory, such as read only memory (ROM) 831 and/or random access memory (RAM) 832. The system memory RAM 832 may include other dynamic storage device(s) (e.g., dynamic RAM, static RAM, and synchronous DRAM). The system memory ROM 831 may include other static storage device(s) (e.g., programmable ROM, erasable PROM, and electrically erasable PROM). In addition, the system memory 830 may be used for storing temporary variables or other intermediate information during the execution of instructions by the processors 820. A basic input/output system (BIOS) 833 containing the basic routines that help to transfer information between elements within computer system 810, such as during start-up, may be stored in ROM 831. RAM 832 may contain data and/or program modules that are immediately accessible to and/or presently being operated on by the processors 820. System memory 830 may additionally include, for example, operating system 834, application programs 835, other program modules 836 and program data 837.

The computer system 810 also includes a disk controller 840 coupled to the bus 821 to control one or more storage devices for storing information and instructions, such as a hard disk 841 and a removable media drive 842 (e.g., floppy disk drive, compact disc drive, tape drive, and/or solid state drive). The storage devices may be added to the computer system 810 using an appropriate device interface (e.g., a small computer system interface (SCSI), integrated device electronics (IDE), Universal Serial Bus (USB), or FireWire).

The computer system 810 may also include a display controller 865 coupled to the bus 821 to control a display 866, such as a cathode ray tube (CRT) or liquid crystal display (LCD), for displaying information to a computer user. The computer system includes an input interface 860 and one or more input devices, such as a keyboard 862 and a pointing device 861, for interacting with a computer user and providing information to the processor 820. The pointing device 861, for example, may be a mouse, a trackball, or a pointing stick for communicating direction information and command selections to the processor 820 and for controlling cursor movement on the display 866. The display 866 may provide a touch screen interface which allows input to supplement or replace the communication of direction information and command selections by the pointing device 861.

The computer system 810 may perform a portion or all of the processing steps of embodiments of the invention in response to the processors 820 executing one or more sequences of one or more instructions contained in a memory, such as the system memory 830. Such instructions may be read into the system memory 830 from another computer readable medium, such as a hard disk 841 or a removable media drive 842. The hard disk 841 may contain one or more datastores and data files used by embodiments of the present invention. Datastore contents and data files may be encrypted to improve security. The processors 820 may also be employed in a multi-processing arrangement to execute the one or more sequences of instructions contained in system memory 830. In alternative embodiments, hard-wired circuitry may be used in place of or in combination with software instructions. Thus, embodiments are not limited to any specific combination of hardware circuitry and software.

As stated above, the computer system 810 may include at least one computer readable medium or memory for holding instructions programmed according to embodiments of the invention and for containing data structures, tables, records, or other data described herein. The term "computer readable medium" as used herein refers to any medium that participates in providing instructions to the processor 820 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 841 or removable media drive 842. Non-limiting examples of volatile media include dynamic memory, such as system memory 830. Non-limiting examples of transmission media include coaxial cables, copper wire, and fiber optics, including the wires that make up the bus 821. Transmission media may also take the form of acoustic or light waves, such as those generated during radio wave and infrared data communications.

The computing environment 800 may further include the computer system 810 operating in a networked environment using logical connections to one or more remote computers, such as remote computer 880. Remote computer 880 may be a personal computer (laptop or desktop), a mobile device, a server, a router, a network PC, a peer device or other common network node, and typically includes many or all of the elements described above relative to computer system 810. When used in a networking environment, computer system 810 may include modem 872 for establishing communications over a network 871, such as the Internet. Modem 872 may be connected to bus 821 via user network interface 870, or via another appropriate mechanism.

Network 871 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 810 and other computers (e.g., remote computer 880). The network 871 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 871.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity. Also, while some method steps are described as separate steps for ease of understanding, any such steps should not be construed as necessarily distinct nor order dependent in their performance.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method of classifying signals using non-linear sparse representations, the method comprising:
    learning a plurality of non-linear dictionaries and a plurality of corresponding sparse coefficient matrices based on a plurality of training signals, wherein (i) each respective non-linear dictionary corresponds to one of a plurality of class labels, and (ii) a non-negative constraint is applied to coefficient matrices used during the learning;
    performing a non-linear sparse coding process on a test signal for each of the plurality of non-linear dictionaries, thereby associating each of the plurality of non-linear dictionaries with a distinct sparse coding of the test signal, wherein the non-negative constraint is applied to each value of the distinct sparse coding of the test signal associated with each of the plurality of non-linear dictionaries during the non-linear sparse coding process;
    measuring a reconstruction error for each respective non-linear dictionary included in the plurality of non-linear dictionaries, wherein the reconstruction error for each respective non-linear dictionary is a matrix norm of the difference between (a) a non-linear transformation of the test signal and (b) the product of the respective non-linear dictionary and the distinct sparse coding associated with the respective non-linear dictionary;
    identifying a smallest reconstruction error among the reconstruction errors measured for the plurality of non-linear dictionaries;
    identifying a particular non-linear dictionary corresponding to the smallest reconstruction error; and
    assigning a class label corresponding to the particular non-linear dictionary to the test signal.

2. The method of claim 1, further comprising:
    cropping a subset of the plurality of training signals prior to building the plurality of non-linear dictionaries.

3. The method of claim 2, wherein each respective test signal included in the subset of the plurality of training signals is cropped by:
    identifying a region of interest in the respective training signal; and
    discarding portions of the respective training signal outside the region of interest.

4. The method of claim 3, wherein the plurality of training signals comprise a plurality of anatomical images and the method further comprises:
    identifying the region of interest in the respective training signal based on a user-supplied indication of an anatomical area of interest.

5. The method of claim 1, wherein the plurality of training signals and the test signal each comprise a k-space dataset acquired using magnetic resonance imaging.

6. The method of claim 5, wherein the plurality of class labels comprises an indication of disease present in an anatomical area of interest depicted in the test signal.

7. The method of claim 1, further comprising:
    displaying an image corresponding to the test signal with an indication of the class label.

8. A method of classifying signals using non-linear sparse representations, the method comprising:
    receiving a plurality of non-linear dictionaries, each respective non-linear dictionary corresponding to one of a plurality of class labels;
    acquiring a test image dataset of a subject using a magnetic resonance imaging device;
    performing a non-linear sparse coding process on the test image dataset for each of the plurality of non-linear dictionaries, thereby associating each of the plurality of non-linear dictionaries with a distinct sparse coding of the test image dataset, wherein a non-negative constraint is applied to each value of the distinct sparse coding of the test signal associated with each of the plurality of non-linear dictionaries during the non-linear sparse coding process;
    measuring a reconstruction error for each respective non-linear dictionary included in the plurality of non-linear dictionaries, wherein the reconstruction error for each respective non-linear dictionary is a matrix norm of the difference between (a) a non-linear transformation of the test signal and (b) the product of the respective non-linear dictionary and the distinct sparse coding associated with the respective non-linear dictionary;
    identifying a smallest reconstruction error among the reconstruction errors measured for the plurality of non-linear dictionaries;
    identifying a particular non-linear dictionary corresponding to the smallest reconstruction error;
    identifying a particular class label corresponding to the particular non-linear dictionary to the test image dataset.

9. The method of claim 8, further comprising:
    using an optimization process to learn the plurality of non-linear dictionaries based on a plurality of training images.

10. The method of claim 9, further comprising:
    cropping a subset of the plurality of training images prior to using the optimization process.

11. The method of claim 10, wherein each respective test image dataset included in the subset of the plurality of training images is cropped by:
    identifying a region of interest in the respective training image; and
    discarding portions of the respective training image outside the region of interest.

12. The method of claim 11, wherein the method further comprises:
    identifying the region of interest in the respective training image based on a user-supplied indication of an anatomical area of interest.

13. The method of claim 8, further comprising:
    displaying the test image dataset simultaneously with the particular class label.

14. A system for classifying image data for clinical diagnosis, the system comprising:
    an imaging device configured to acquire test image dataset of a subject; and an image processing computer configured to:
receive a plurality of non-linear dictionaries, each respective non-linear dictionary corresponding to one of a plurality of class labels,
perform a non-linear sparse coding process on the test image dataset for each of the plurality of non-linear dictionaries, thereby associating each of the plurality of non-linear dictionaries with a distinct sparse coding of the test image dataset, wherein a non-negative constraint is applied to each value of the distinct sparse coding of the test signal associated with each of the plurality of non-linear dictionaries during the non-linear sparse coding process,
measure a reconstruction error for each respective non-linear dictionary included in the plurality of non-linear dictionaries, wherein the reconstruction error for each respective non-linear dictionary is a matrix norm of the difference between (a) a non-linear transformation of the test image dataset and (b) the product of the respective non-linear dictionary and the distinct sparse coding associated with the respective non-linear dictionary,
identifying a smallest reconstruction error among the reconstruction errors measured for the plurality of non-linear dictionaries;
identify a particular non-linear dictionary corresponding to the smallest reconstruction error, and
identifying a particular class label corresponding to the particular non-linear dictionary to the test image dataset; and
a display configured to present the particular class label.

15. The system of claim 14, wherein the image processing computer is further configured to perform an optimization process to learn the plurality of non-linear dictionaries based on a plurality of training images.

16. The system of claim 15, wherein the image processing computer is further configured to apply a non-negative constraint to the non-linear sparse coding process and the optimization process.

\* \* \* \* \*